Oct. 11, 1949.  C. E. HASTINGS ET AL  2,484,030
ELECTRICAL DEFLECTOMETER
Filed Aug. 12, 1946  2 Sheets-Sheet 1
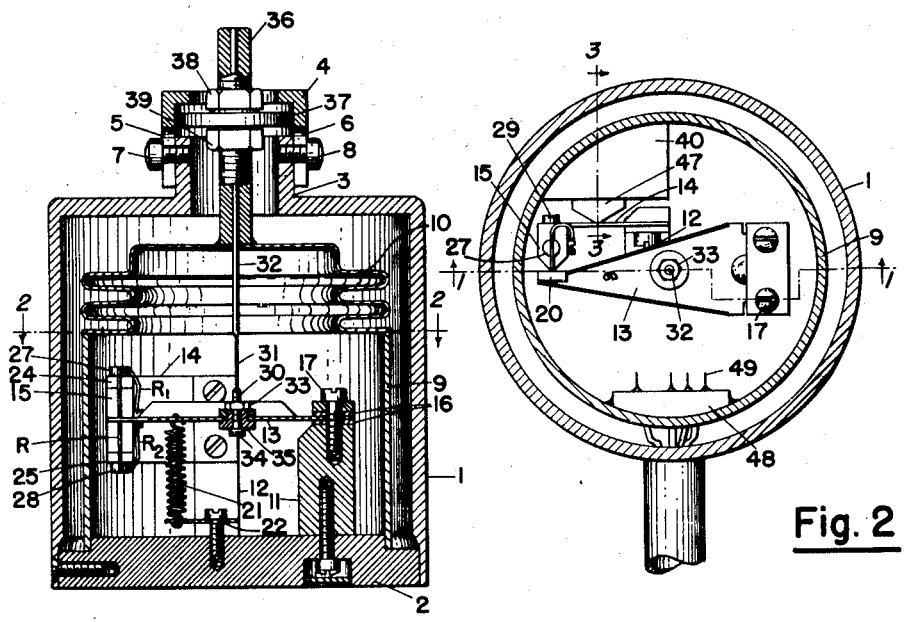
Fig. 1
Fig. 2
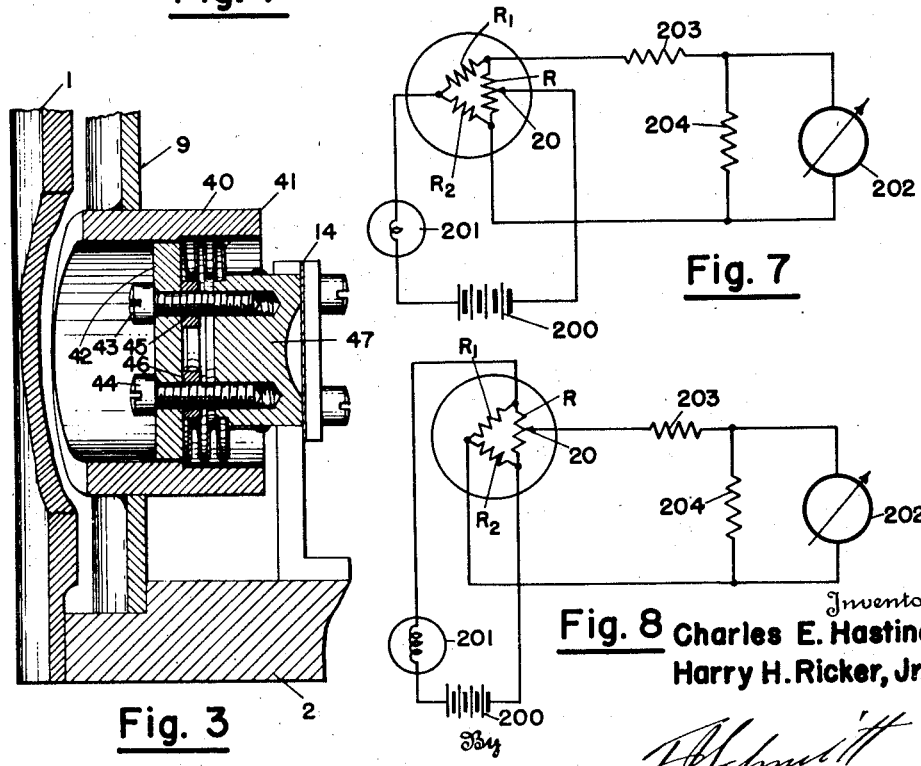
Fig. 3
Fig. 7
Fig. 8
Inventors
Charles E. Hastings
Harry H. Ricker, Jr.
By
Attorney Oct. 11, 1949.　　C. E. HASTINGS ET AL　　2,484,030
ELECTRICAL DEFLECTOMETER Filed Aug. 12, 1946　　　　　　　　　　　　　　2 Sheets-Sheet 2

Inventors
Charles E. Hastings
Harry H. Ricker, Jr.

By F. J. Schmitt
Attorney

Patented Oct. 11, 1949

2,484,030

UNITED STATES PATENT OFFICE 2,484,030

ELECTRICAL DEFLECTOMETER

Charles E. Hastings, Hampton, Va., and Harry H. Ricker, Jr., Philadelphia, Pa.

Application August 12, 1946, Serial No. 689,848

11 Claims. (Cl. 323—75)

(Granted under the act of March 3, 1883, as amended April 30, 1928; 370 O. G. 757)

This invention relates to an instrument for measuring deflections. More particularly, this invention relates to an electrical deflectometer and deflectometer hook-up adapted for remote indication or recording of either static or dynamic deflections.

Various physical phenomena such as force, acceleration, moment, stress, hydraulic pressure, etc., can be measured as a function of deflection, either by taking deflection measurements directly on the particular part undergoing test, or by employing auxiliary devices in conjunction with the deflectometer for converting the physical phenomenon into a measurable deflection. Hence there are many applications, both in industry and research, for an accurate instrument for measuring deflection.

In many of these applications, it may be necessary to measure very small deflections at relatively inaccessible locations and under adverse conditions. Such an application might be the measurement of the small deflections of force-measuring springs in a dynamometer. In other test installations the measurement of small deflections may be complicated by the fact that the deflections are dynamic, rather than static. Existing deflectometers and deflectometer circuits have been found to be generally unsatisfactory for the measurement of these small deflections.

Accordingly, it is among the objects of our invention to devise an instrument for measuring small deflections.

It is a further object to make this instrument small and compact and capable of remote indication or recording of deflection, so that the instrument will be adaptable for installation in relatively inaccessible locations.

Yet another object of our invention is to devise an instrument which will measure dynamic deflections as well as static deflections.

A further object of our invention is to devise a deflectometer and recording circuit such that the combination will have a linear response over wide variations of deflections.

Another object of our invention is to construct an instrument which will be sturdy and long-lived and require a minimum of maintenance.

These and other objects will be apparent from our specification, claims, and drawings in which Fig. 1 is a cross-sectional view of the preferred form of our invention taken along line 1—1 of Fig. 2;

Fig. 2 is a cross-sectional view taken along section line 2—2 of Fig. 1;

Fig. 3 is a cross-sectional view taken along section line 3—3 of Fig. 2;

Fig. 7 is a circuit diagram showing a preferred remote recording circuit for use with our deflectometer; and Fig. 8 is a modified circuit diagram of the remote recording circuit.

Figure 4:
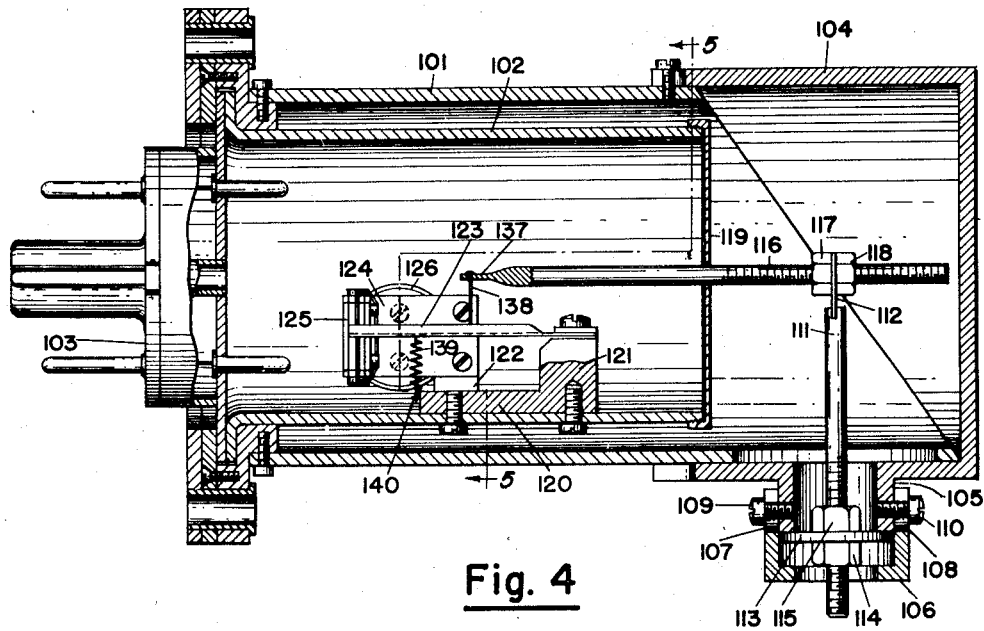
Fig. 4 is a cross-sectional view of a modification of our invention.

As shown in detail in Figs. 1, 2, 3 and 6, the deflectometer comprises an outer housing 1 mounted on a base 2. On the extended cylindrical portion 3 of the housing 1 is mounted a stop cap 4. The stop cap 4 is provided with two slots 5 and 6, permitting adjustment of the stop cap 4 through manipulation of set screws 7 and 8. Affixed to base 2 and in sealed relationship therewith is a shell 9. Illustrative of the compactness of our device is the fact that the shell 9 is preferably constituted by the outer shell of a conventional metal radio tube. Affixed to the top of shell 9 and in sealed relationship therewith is an expandible metal bellows 10. A heel block 11 is supported on base 2 as is an angle bracket 12. The heel block supports flexible bridge arm 13 and the vertical leg of bracket 12 supports flat rectangular spring 14 on the free end of which is mounted bridge element 15.

Figure 6:
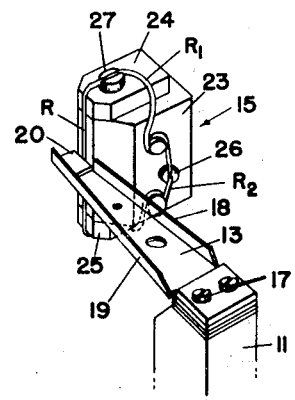
Fig. 6 is a perspective view of a slidewire Wheatstone bridge arrangement common to the deflectometers of Figs. 1 and 4.

As shown in detail in Figs. 1, 2 and 6, the flexible bridge arm is insulated from heel block 11 by non-conductive inserts 16 and is held in place by screws 17. Formed on the sides of the bridge arm are flanged peripheral portions 18 and 19 to provide for bending rigidity. Soldered to the free end of bridge arm 13 is a metal tip 20 preferably of Monel metal, which serves as a slidewire contact, as will be made clear hereinafter. Spring 21, one end of which is attached to the bridge arm and the other end to a non-conductive retaining member 22 serves to bias the bridge arm toward a central position on the bridge element.

Referring to Fig. 6, the bridge element 15 comprises a block 23, preferably of Micarta, brass end plates 24 and 25 and a continuous wire bridge circuit whose ends are soldered to screw 26. The various portions of the bridge circuit are conveniently referred to as R, $R_1$ and $R_2$. Although we prefer to employ ohmax wire for our bridge circuit, manganin wire or any other suitable substitute may be employed within the scope of our invention. The portion R of the bridge circuit in this form of our invention is approximately ⅜ of an inch long and is stretched tight across and partially embedded within a groove formed in the face of block 23. The exposed surface of portion R serves as a slidewire making contact with contact tip 20. The extremities of portion R are soldered to the heads of screws 27 and 28 which also retain plates 24 and 25 on the Micarta block 23. The portions $R_1$ and $R_2$ of the bridge circuit are looped and these looped portions cemented to the block 15. Block 15 is affixed to spring 14 by screws, one of which is shown as 29.

Referring to Figs. 1 and 2, a connector rod is fixed to bridge arm 13. This rod comprises a threaded lower portion 30, a flexible wire portion 31 and a rigid rod portion 32, connection between the various portions being made by soldering. The threaded portion 30 engages bridge arm 13 and is rigidly secured thereto by nut 33 cooperating with flanged portion 34. The bridge arm is insulated from the connector rod by nonconductive insert 35. The rod portion 32 passes through a hole in the upper surface of bellows 10 and is squeeze-fitted into coupling rod 36 and soldered thereto. Coupling rod 36 is soldered to the upper surface of bellows 10 to form a seal.

A collar 37 is mounted on the upper end of the coupling rod 36 and held in place by lock nuts 38 and 39 which threadedly engage the rod. Lock nuts 38 and 39 also serve as a means for adjusting the position of the collar 37 on rod 36. As is obvious from Fig. 1, the collar 37, stop cap 4, and the cylindrical portion 3 cooperate with each other to limit reciprocal movement of the connector rod.

A bridge adjuster is provided for controlling the contact pressure between slidewire portion R and contact tip 20. As shown in Figs. 2 and 3, this bridge adjuster comprises a tube 40 soldered to the periphery of an opening in the shell 9. An expandible bellows 41 is soldered to disc 42 which in turn is soldered to the inner wall of tube 40. Two screws 43 and 44 are slidably mounted in disc 42 and held in place by collars 45 and 46 which are soldered to the screw. The screws 43 and 44 threadedly engage a knife-edged plug 47 which in turn is mounted on and soldered to bellows 41 to form a seal. The knife-edged plug bears against spring 14. As is obvious, rotation of screws 43 and 44 will reciprocate the knife-edged plug towards or away from spring 14, thus adjusting the contact pressure between slidewire portion R and contact tip 20.

Electrical connection of the various parts of the bridge circuit is made to contact plate 48, four points of connection being shown thereon together with their external leads 49. Not shown are the internal electrical connections from the bridge circuit and bridge arm to the contact plate. These comprise three connections to screw heads 26, 27, and 28 of the bridge element, respectively, and preferably a pigtail connection from the remaining point of connection on the contact plate to flexible bridge arm 13. These connections have not been shown since they are conventional and to include them would unduly confuse the drawings.

As will be understood from the above description, the shell 9, bellows 10 and base 2 enclose a sealed chamber. This sealed chamber is filled with an electrically non-conductive gas such as either hydrogen or helium gas for purposes which will hereinafter be described. A non-conducting liquid might also be used, although the liquid will not be as satisfactory for dynamic purposes. The means for filling the chamber with gas are not shown, but is conventional and well known in the art.

In operation, once proper adjustment of the contact pressure on the bridge slidewire element R is made, the coupling rod 36 is reciprocated as a function of the deflection which is to be measured. The motion of the coupling rod 36 is transmitted through the connector rod to flexible bridge arm 13 resulting in displacement of contact 20 along slidewire R. The bridge unbalance is recorded on a galvanometer or its equivalent, as will be explained hereinafter to give a measure of the deflection.

It will be noted that the deflectometer mechanism is free of pivots or pinned joints and that the bridge arm 13 is rigid except in its deflecting plane. In addition, the contact pressure is supplied through slidewire R, the bridge element spring 14 being rigid in all other directions. These various features combine to give an instrument substantially free from mechanical hysteresis and permit the accurate measurement of deflections including those smaller than 0.001 inch over a full range of measurement of 0.07 inch. In the deflectometer described above, the hysteresis will be less than ±0.0002 inch for a contact pressure of approximately 10 grams.

Figure 5:
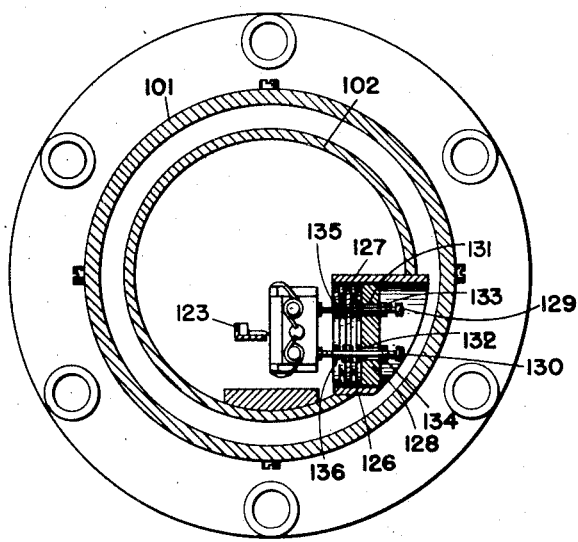
Fig. 5 is a cross-sectional view taken along section line 5—5 of Fig. 4.

In Figs. 4 and 5 is shown a modification of our deflectometer which eliminates the need for an expandible bellows, thus making the instrument free of possible pressure effects, and wherein a modified linkage arrangement, having an adjustable sensitivity, is employed for transmitting motion to the bridge arm. In this modification a housing 101 and shell 102 of an ordinary metal radio tube is supported on a standard octal socket 103. To the top of the housing 101 is affixed a cover 104 having an outstanding cylindrical portion 105. Mounted on portion 105 is a stop hood 106, having slots 107 and 108 to permit adjustment of the hood on portion 105 through manipulation of screws 109 and 110. Extending through stop hood 106 is coupling rod having a rigid portion 111 and a flexible flat spring portion 112. Fitted around the rigid portion 111 is a stop collar 113 held in place by stop nuts 114 and 115 threadedly engaging portion 111. The flexible flat spring 112 is in the form of a yoke fitting around rigid connector rod 116 and locked in place by lock nuts 117 and 118 threadedly engaging the rod 116. Adjustment of the lock nuts along the connector rod will adjust the sensitivity of the instrument. The rod 116 extends through and is soldered to a thin flexible diaphragm 119, the soldered joint forming a seal. The flexible diaphragm 119 is in turn soldered to shell 102, forming a sealed space within shell 102. The flexible nature of diaphragm 119 permits it to serve as a fulcrum for connector rod 116.

Fixed to the side of shell 102 is a base 120 having outstanding legs 121 and 122. Supported on leg 121 and insulated therefrom is a bridge arm 123 identical in construction with bridge arm 13 previously described. Supported on leg 122 is a flat rectangular spring 124 and bridge element 125 similar to spring 14 and bridge element 15 previously described.

A bridge contact pressure adjuster is employed which serves the same function as the adjuster previously described, but which is of modified construction. This bridge adjuster comprises a tube 126 soldered to the periphery of an opening in shell 102, an expandible bellows 127 soldered to disc 128 which in turn is soldered to tube 126. Two screws 129 and 130 are slidably mounted in bores 131 and 132 of disc 128. These screws also pass through openings in the face of bellows 127, being soldered to the peripheral edges of these openings. The ends of the screws abut on flat spring 124. Nuts 133 and 134 threadedly engage screws 129 and 130 and bear against the surface of disc 128. Springs 135 and 136 maintain screws 129 and 130 in tension. Rotation of nuts 133 and 134 causes reciprocation of the screws 129 and 130 toward or away from spring 124. Since the ends of screws 129 and 130 abut on spring 124, adjustment of the bridge contact pressure will be obtained by rotation of nuts 133 and 134.

The connector rod 116 has a flexible tip portion 137 to which is soldered one end of a flexible wire 138. The other end of wire 138 is fixed to bridge arm 123 and insulated therefrom. Spring 139 is fixed to bridge arm 123 at one end and to base 120 at the other end, the latter connection being made through an insulating strip 140. The spring 139 serves to bias the bridge arm 123 toward a central position on the bridge element 125.

As may be gathered from the above, the shell 102 encloses a sealed chamber. This chamber is filled with a nonelectrically-conductive gas such as either helium or hydrogen or even with a non-electrically-conductive liquid.

Electrical connection of the various parts of the bridge circuit and bridge arm is made in a manner similar to that described previously, except that the connections are made directly to the prongs of the octal base in lieu of to a contact plate. These connections have not been shown since they are conventional and to include them would unduly confuse the drawings.

The preferred deflection indicating or recording circuit for use with the deflectometers of either Fig. 1 or Fig. 4 is shown in Fig. 7, where the bridge elements are labelled as R, $R_1$ and $R_2$ to correspond with those shown in Fig. 6. Connected across the junction of $R_2$ and $R_1$ and the slidewire contact point 20 is a 12 volt battery 200 in series with a ballast tube 201 to provide for constant current supply. Connected across the junction of $R_2$ and R and the junction of $R_1$ and R is a recording galvanometer 202. Resistances 203 and 204 are arranged in the galvanometer circuit for proper sensitivity and critical damping of the galvanometer.

With the short slidewire employed, ⅜ of an inch long, it would ordinarily be difficult to obtain sufficient voltage gradient along the slidewire to operate the instrument satisfactorily. Enclosing the slidewire element within a hydrogen or helium atmosphere, hydrogen and helium having a heat conductivity approximately six times that of air, will result in rapid cooling of the slidewire and therefore a higher current flow and larger voltage gradient along the slidewire. We have found that with the slidewire enclosed within a hydrogen or helium atmosphere, a 12 volt battery will produce an adequate voltage gradient for our purposes.

The recording circuit shown in Fig. 7 has a number of unique advantages. The arrangement of the ballast tube in circuit with the battery and the moving contact provides for a constant current supply to the bridge circuit, regardless of limited changes in contact resistance and battery voltage, and therefore for a galvanometer reading which will be unaffected by such changes. A further advantage of this arrangement stems from the fact that more voltage will be available to break down any oxide film which may form on the slidewire and contact. The oxygen-free atmosphere surrounding the slidewire will also be helpful in preventing oxidation of the contact and slidewire, permitting the use of lower contact pressures with resulting longer life for the instrument.

A further significant advantage arising from the supply of a constant current to the Wheatstone bridge, instead of the constant voltage conventionally supplied, arises from the fact that the unbalanced currents are purely linear with the movement of the contact along the slidewire. Thus the reading of the recording galvanometer will be linear with respect to the deflection being measured by the instrument. The output of an unbalanced Wheatstone bridge supplied with a constant voltage, in the conventional manner, has an S-shaped curve if carried to high percentages of bridge unbalance. An S-shaped curve has well known disadvantages.

A modification of our recording circuit is shown in Fig. 8 wherein the constant current terminals are connected across the junction of $R_2$ and R and the junction of $R_1$ and R, and the galvanometer connections are made across the junction of $R_2$ and $R_1$ and the slidewire contact 20. This circuit has the linear characteristics of that shown in Fig. 7. However, in this circuit, changes in resistance at the slidewire may be responsible for some error in galvanometer reading.

The invention described herein may be manufactured and used by or for the Government of the United States of America for governmental purposes without the payment of any royalties thereon or therefor.

What is claimed is:

1. In an electrical deflectometer; a fixed supporting base; a slidewire element; a contact element adapted to engage said slidewire element; a first flexible means for mounting said slidewire element on said supporting base and adapted to restrict movement of said slidewire element to a direction toward and away from said contact element; a second flexible means for mounting said contact element on said supporting base and adapted to restrict movement of said contact element to a direction along the length of the slidewire element; and means cooperating with said contact element and said first flexible means for adjusting the contact pressure between the slidewire element and said contact element.

2. In an electrical deflectometer; a fixed supporting base; a slidewire element; a contact element adapted to engage said slidewire element; a first flexible means for mounting said slidewire element on said supporting base comprising a flat cantilever spring element, the free end of which is connected to said slidewire element, adapted to restrict movement of said slidewire element to a direction toward and away from said contact element; a second flexible means for mounting said contact element on said supporting base comprising a flat cantilever spring element, the free end of which is connected to said contact element, adapted to restrict movement of said contact element to a direction along the length of the slidewire; and means bearing on said first mentioned flat cantilever spring element for adjusting the contact pressure between the slidewire element and said contact element.

3. In an electrical deflectometer; a fixed supporting base; a slidewire element; a contact element adapted to engage said slidewire element; a first flexible means for mounting said slidewire element on said supporting base and adapted to restrict movement of said slidewire element to a direction toward and away from said contact element; a second flexible means for mounting said contact element on said supporting base comprising a flat cantilever spring element, the free end of which is connected to said contact element, adapted to restrict movement of said contact element to a direction along the length of the slidewire; a rigid connecting rod adapted for connection at its one end to a remote source of excitation; a flexible rod rigidly connected to the other end of said connecting rod and to said second flexible means whereby the position of said contact element along the slidewire element will be varied in response to the source of excitation, and the use of either pivots or pinned joints will be avoided.

4. In an electrical deflectometer; a cylindrical casing open at both ends; a supporting base closing one end of the casing; a flexible bellows affixed to the other end of the casing and adapted to form a closed chamber within said casing and said bellows; a slidewire element within said chamber and mounted on said supporting base; a flexible arm member within said chamber and mounted on said supporting base, said arm member having a contact element in contact with said slidewire element; a connector rod protruding through said bellows and rigidly affixed thereto; a flexible rod located within said chamber, one end of said flexible rod being rigidly connected to said connector rod and the other end of said flexible rod being rigidly connected to said arm member whereby actuation of said connector rod will result in varying the position of said contact element along said slidewire element.

5. In an electrical deflectometer; a cylindrical casing open at both ends; a supporting base closing one end of the casing; a flexible diaphragm closing the other end of the casing to form a closed chamber within said casing; a slidewire element within said chamber and mounted on said cylindrical casing; a flexible arm member within said chamber and mounted on said casing, said arm member having a contact element in contact with said slidewire element; a connector rod protruding through said flexible diaphragm and affixed thereto whereby the flexible diaphragm will act as a fulcrum for the connector rod; a flexible rod located within said chamber, one end of said flexible rod being rigidly connected to said connector rod and the other end of said flexible rod being rigidly connected to said arm member whereby actuation of said connector rod will result in varying the position of said contact element along said slidewire element.

6. For use in an electrical deflectometer, a Wheatstone bridge including a non-conductive block of substantially rectangular shape with front and side faces; a shallow groove formed in the front face of said block and extending lengthwise of said block; two oppositely disposed metal plates affixed to each end of said block respectively by a first and second metal screw, each of said plates having a shallow groove aligned with the groove in said block; a third metal screw affixed in the side face of said block; a continuous resistance wire extending from said third metal screw to said first metal screw to form one leg of said bridge, then along and partially imbedded in said shallow grooves of one metal plate, the block and the other metal plate, respectively, to said second metal screw, to form two more legs of said bridge, and from said second metal screw to said third metal screw to form the fourth leg, the said resistance wire being soldered to said metal screws at the junctions of the wire with the screws, said junctions at the first and second screws providing a pair of opposite connections for said bridge, and a slidewire contact for cooperation with the portion of said wire extending lengthwise of said block, and providing with the junction at said third screw the other pair of opposite connections for said bridge.

7. In an electrical deflectometer: a sealed hollow casing having a flexible portion; a rod protruding through said portion and affixed thereto; a bridge network mounted in said casing, said network comprising a resistive element forming two adjacent arms of the bridge and a flexible member having a contact element in contact with said resistive element and forming the junction of said arms; and a flexible arm in said casing having its ends rigidly connected to said rod and said member, respectively, whereby actuation of said rod will vary the resistances of said two adjacent arms of said bridge.

8. In an electrical deflectometer according to claim 7 wherein said casing is filled with a non-corrosive gas having a heat conductivity greater than that of air.

9. In an electrical deflectometer: a sealed container having a flexible portion; a rod protruding through said portion and affixed thereto; a bridge network mounted in said container, said network comprising a resistive element and a movable contact on said element forming two adjacent legs of the bridge; and means in said container interconnecting said rod and said contact whereby movement of said rod varies the resistances of the legs of the bridge.

10. In an electrical deflectometer: a sealed container having a flexible portion; a rod protruding through said portion and affixed thereto; a bridge network mounted in said container, said network comprising movable means for varying the electrical balance thereof; and means in said container interconnecting said rod and said movable means whereby movement of said rod varies the balance of the bridge.

11. In an electrical deflectometer: a sealed hollow container having a base and a flexible upper portion; a bridge network in said container comprising a resistive element and a movable contact on said element forming two adjacent legs of the bridge; flexible means for mounting said contact on said base, said means restricting movement of said contact to a direction along the length of said element; and a rod connected to said flexible means, said rod extending through said flexible portion and affixed thereto whereby movement of said rod varies the resistances of the legs of the bridge.

CHARLES E. HASTINGS.
HARRY H. RICKER, Jr.

REFERENCES CITED

The following references are of record in the file of this patent:

UNITED STATES PATENTS

| Number | Name | Date |
|---|---|---|
| 880,074 | Haagn | Feb. 25, 1908 |
| 1,448,540 | Housekeeper | Mar. 13, 1923 |
| 2,148,013 | Carlson | Feb. 21, 1939 |
| 2,203,523 | Cunningham | June 4, 1940 |
| 2,391,058 | Lingel | Dec. 18, 1945 |